United States Patent [19]

Rushton et al.

[11] 3,715,191
[45] Feb. 6, 1973

[54] APPARATUS FOR MAKING WET PROCESS PHOSPHORIC ACID

[75] Inventors: William E. Rushton, South Holland; Gordon E. Seavoy, Chicago; Woodruff A. Morey, Flossmoor, all of Ill.

[73] Assignee: Whiting Corporation

[22] Filed: July 13, 1970

[21] Appl. No.: 54,438

[52] U.S. Cl. .............. 23/260, 23/273 L, 23/304, 23/285, 423/320, 210/522, 210/521, 210/537, 210/73, 210/74
[51] Int. Cl. .................. C01b 25/22, B01j 1/00
[58] Field of Search ....23/165, 304, 273 L, 260, 285; 210/522, 521, 537, 73, 74, 75; 209/162, 173

[56] References Cited

UNITED STATES PATENTS

| 2,772,210 | 11/1956 | Read | 210/75 X |
| 2,710,247 | 6/1955 | Knowles et al. | 23/165 |
| 3,495,254 | 2/1970 | Clemens | 210/522 |
| 2,856,270 | 10/1958 | Saeman | 23/273 L |
| 3,010,805 | 11/1961 | Cheng | 23/273 L |
| 2,337,385 | 12/1943 | Gross | 210/66 X |

Primary Examiner—James H. Tayman, Jr.
Attorney—Greist, Lockwood, Greenawalt & Dewey

[57] ABSTRACT

An apparatus and method for improving the filterability of wet process phosphoric acid reaction slurry. The slurry is divided into a least two segments, one of which contains only calcium sulfate crystal particles below a predetermined size, for example, only particles below 200 mesh, ant the other segment contains the remaining larger size calcium sulfate crystal particles. The slurry segment containing the larger particles is then discharged directly onto the porous filter media, usually filter cloth, with the larger crystal particles collecting thereon. The slurry segment containing the smaller size calcium sulfate crystal particles is then deposited directly onto the larger crystal particles which have collected on the porous filter media. In this manner, the crystal fines are effectively prevented from blinding the porous filter media, thereby prolonging the life thereof without reducing the capacity or efficiency of such filter.

5 Claims, 3 Drawing Figures

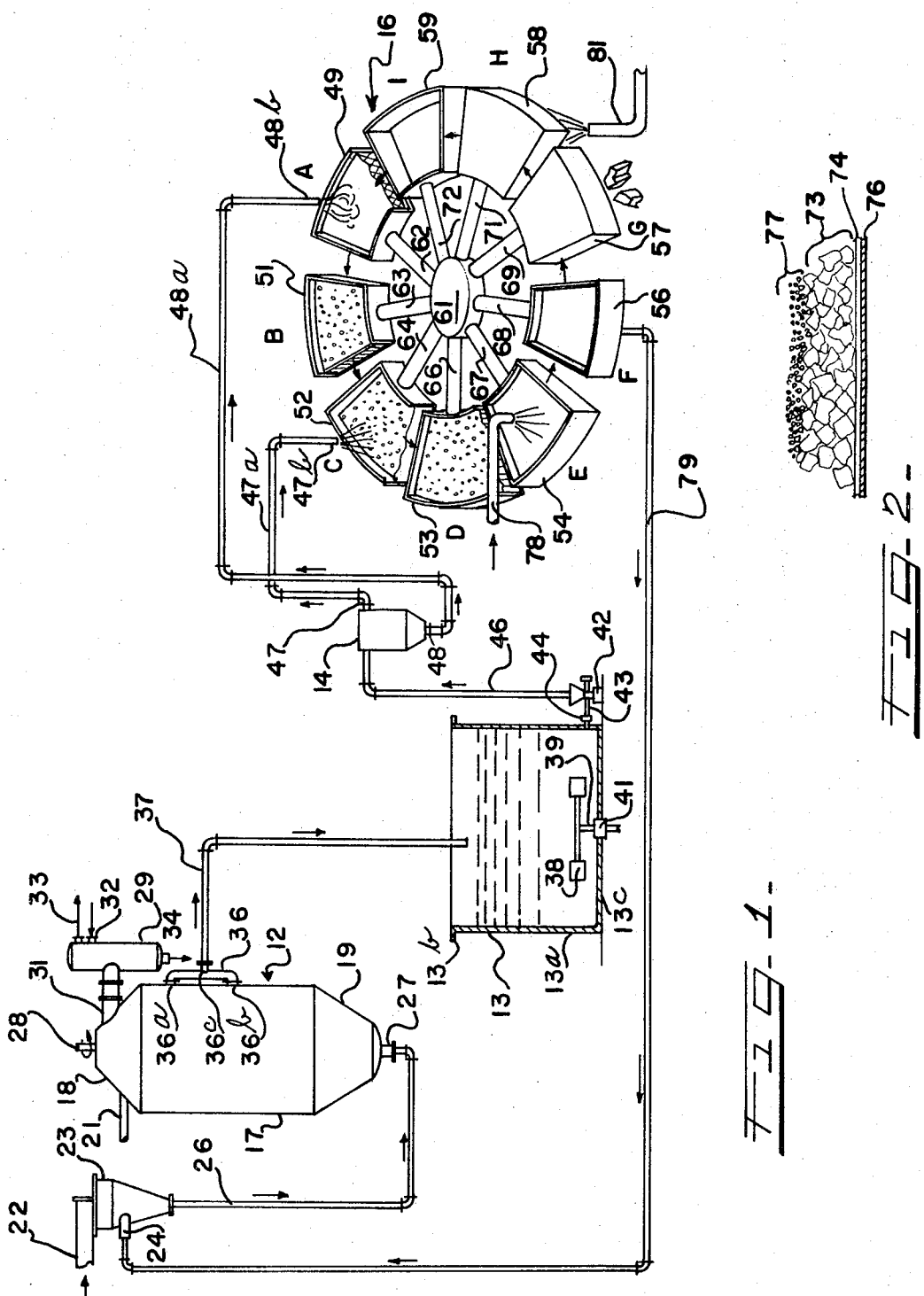

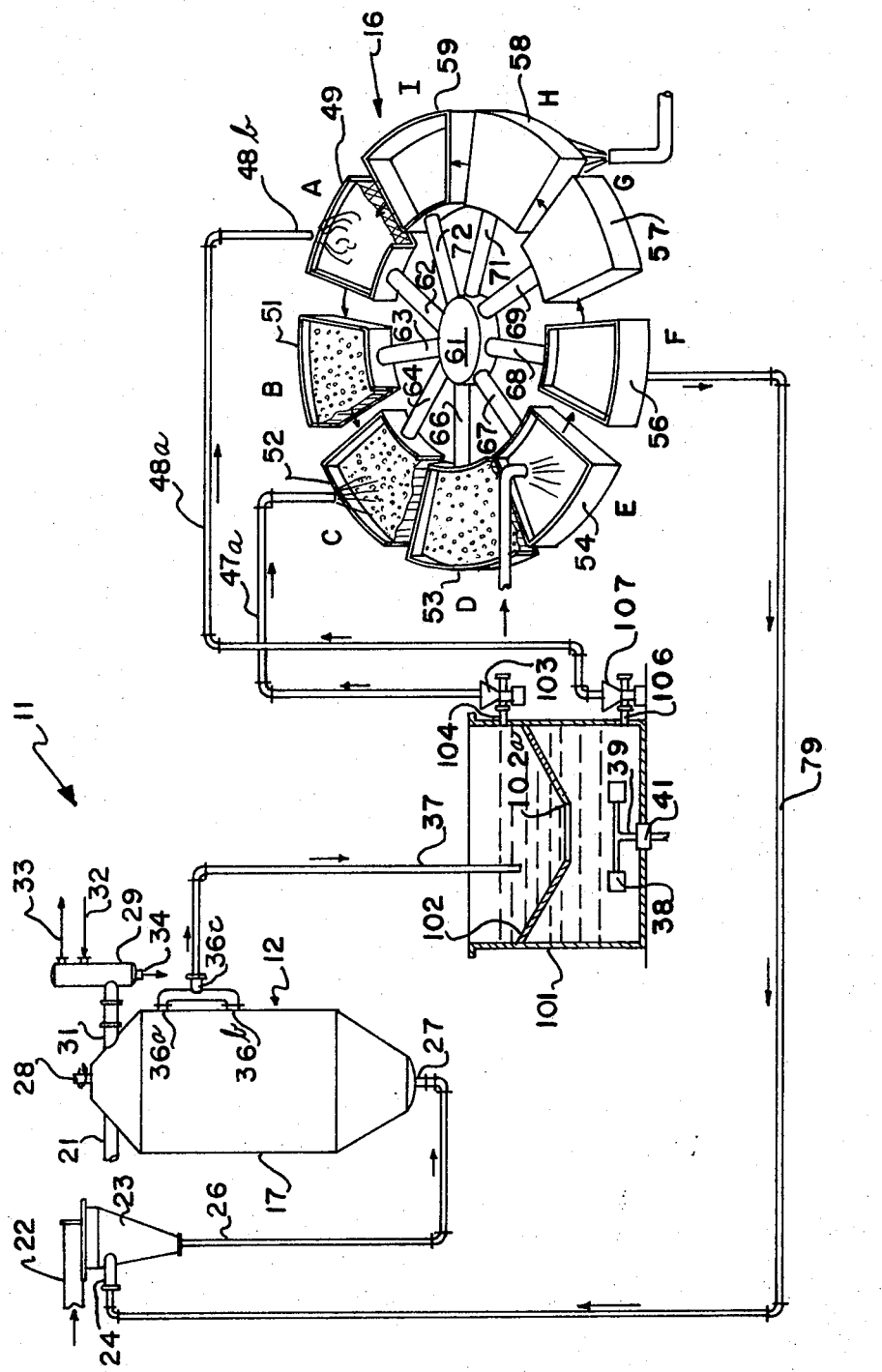

APPARATUS FOR MAKING WET PROCESS PHOSPHORIC ACID

BACKGROUND AND DESCRIPTION OF THE INVENTION

The present invention generally relates to an improved method and apparatus for producing wet process phosphoric acid and, more specifically, to an apparatus and method for improving the filterability of wet process reaction slurry.

In the manufacture of phosphoric acid by the wet process, reactants which include phosphate rock, sulfuric acid and water are combined in a reactor to produce a reaction slurry which includes calcium sulfate crystals. Typically, these calcium sulfate crystal particles vary in size over a wide range and include very small crystals which can be generally classified as crystal fines. For example, in some conventional wet process phosphoric acid producing installations, approximately 50 percent, by weight, of the calcium sulfate crystal particles, usually in the form of gypsum ($CaSO_4 \cdot 2H_2O$) are 325 mesh and smaller size crystal particles. This slurry is subjected to a filtration operation wherein the liquid portion thereof is separated from the calcium sulfate crystals and other solids. During this filtration operation, wash water is employed to remove the phosphoric acid which has occluded on the calcium sulfate crystals. Product losses in a wet process operation for the manufacture of phosphoric acid are related to the filterability and the washability of the calcium sulfate crystals produced. In this regard, the very fine calcium sulfate crystal particles in the slurry, for example, those smaller than 200 mesh size and particularly those below 325 mesh size, which are formed in the reaction and carried through with the slurry to the filters, tend to clog the pores of the filter media, usually a filter cloth, and thereby blind the same. Since these crystal fines cannot be removed from the pores of the filter media, it is necessary in conventional systems to replace such thus blinded filter media at frequent intervals.

The present invention provides an improved method and apparatus for making wet process phosphoric acid wherein the filterability of the reaction slurry is substantially enhanced. In accordance with this invention, the wet process reaction slurry containing the wide size range of calcium sulfate crystal particles is divided into at least two segments, one of which contains calcium sulfate crystal particles, substantially all of which are below a predetermined particle size and the other slurry segment of which contains calcium sulfate crystal particles which are substantially all larger in size than the predetermined particle size. In the initial segment, the so-called crystal fines which exhibit a tendency to clog the pores of the filter are contained. The slurry segment containing the larger crystal particles is then discharged directly onto the porous filter media of the filter and the larger calcium sulfate crystal particles contained therein collected on such porous media. Thereafter, the slurry segment containing the smaller size calcium sulfate crystal particles is deposited directly onto the collected larger size calcium sulfate crystal particles. In this manner, the larger crystal particles effectively act as a filter precoat which prevents substantially all of the smaller size calcium sulfate crystal particles from coming in contact with the porous filter media. Accordingly, blinding of such filter media by such crystal fines is effectively avoided while, at the same time, all of such crystal particles are washed, thereby providing for higher phosphoric acid recoveries and prolonged filter media life.

It is, therefore, an important object of the present invention to provide a new and improved method for producing wet process phosphoric acid wherein the filterability of the wet process reaction slurry produced is characterized by a substantially improved filterability.

Another object of the present invention is to provide a new and improved method and apparatus for producing wet process phosphoric acid wherein blinding of the filter media by the crystal fines is substantially reduced if not totally eliminated.

Another object of the present invention is to provide a new and improved method and apparatus for producing wet process phosphoric acid wherein calcium sulfate crystal fines are effectively prevented from contacting the porous filter media yet, wherein such fines are effectively washed so as to accomplish the removal of the occluded phosphoric acid associated with such crystal fines.

Another object of the present invention is to provide a new and improved method for filtering wet process reaction slurry produced in systems wherein gypsum and/or calcium sulfate hemihydrate ($CaSO_4 \cdot \frac{1}{2} H_2O$) are produced which method involves separation of the fines from the reaction slurry and depositing such fines onto a filter precoat which was formed on the porous filter media by initially depositing larger size calcium sulfate crystal particles thereon.

Other and further objects of the present invention will be apparent from the following detailed description thereof taken in conjunction with the accompanying drawings wherein:

FIG. 1 is a diagrammatic view of an installation for producing phosphoric acid by the wet process in accordance with a first embodiment of the present invention;

FIG. 2 is a fragmentary side elevational view of a portion of the filter media illustrating the manner in which larger crystal particles collect directly on the filter media and the crystal fines collect on such larger particles in accordance with the present invention;

FIG. 3 is a diagrammatic view of another installation for producing phosphoric acid by wet process techniques in accordance with a second embodiment of the present invention.

Referring to the drawings, and with particular reference to FIG. 1, a wet process phosphoric acid manufacturing installation embodying the present invention is generally designated by the reference numeral 11. Installation 11 includes a reactor unit 12, filter feed tank 13, classifier 14 and filter 16 suitably interconnected with process piping which will be described in greater detail hereinafter.

In the illustrated embodiment of FIG. 1, the reactor unit 11 is generally constructed along the lines described in co-owned U. S. Pat. No. 3,416,889, issued Dec. 17, 1968 and entitled "Process and Apparatus for Manufacturing Phosphoric Acid." In this regard, however, it should be noted that the present invention is applicable to virtually all types of wet process phosphoric acid reactors where calcium sulfate crystal fines, in the form of gypsum, calcium sulfate hemihydrate or otherwise, are present in the reaction slurry which is to be filtered for separation of the acid from the calcium sulfate crystals and other solids. Accordingly, modifications in the precise form of reactor shown in this embodiment can be made by those skilled in this art without departing from the scope of the present invention.

The reactor 12 includes a generally fixed diameter shell 17 having frusto-conical top and bottom end portions 18 and 19, respectively. Sulfuric acid is introduced into the reactor unit 12 through a suitable inlet 21 which, in the illustrated embodiment, is shown to feed directly into the top end portion 18. If desired, such sulfuric acid can be discharged onto the body of phosphoric acid slurry contained in the unit 12 through a plurality of spray heads (not illustrated) which are shown and described in greater detail in the above-mentioned co-owned U. S. Letters Patent No. 3,416,889. Phosphate rock is introduced into a screw conveyor 22 which discharges directly into an external mixing hopper 23 which also receives weak return phosphoric acid from the filter 16 through a suitable inlet connection 24. This arrangement serves as a means for efficiently mixing the rock with the return acid to form a slurry which is withdrawn from the bottom of the hopper 23 through a process line 26 and introduced into the reactor 12 through a suitable reactor inlet connection 27 located in the bottom end portion 19.

While not shown, suitable flow direction means can be provided in the reactor 12 which in cooperation with a suitable impeller, the drive shaft 28 of which is shown extending upwardly through the top end portion 18, circulates the body of reaction slurry at a rate and in a flow pattern adapted to provide for uniformity in temperature and concentration throughout such body so as to achieve improved crystal growth control as described more fully in said previously mentioned U. S. Letters Patent No. 3,416,889.

A vacuum is maintained in the upper end of the reactor unit 12 by means of a suitable condenser 29 which communicates with the interior of the reactor unit 12 through a suitable overhead vapor line 31. In accordance with conventional condenser construction, the condenser 29 is provided with a cold water inlet 32 which receives the cooling liquid, an overhead outlet 33 for discharge of non-condensable materials and a condensate discharge outlet 34.

Reaction slurry is continuously discharged from the reactor unit 12 through a vertical side tube 36 which has an upper end portion 36a positioned to communicate with the free-board space above the body of reaction slurry contained in the unit 12 and a lower inlet connection 36b positioned to communicate with the liquid slurry contained in the unit 12 below the normal liquid operating level thereof. A slurry discharge line 37 extends from connection 36c for discharge of the reaction slurry into the filter feed tank 13.

Filter feed tank 13 is, in the illustrated embodiment, provided with a generally vertically extending side wall 13a which extends at its upper end into a generally outwardly extending flange portion 13b and at the lower end into a generally flat planar bottom 13c. Accordingly, as is shown, the contents of the filter feed tank in the illustrated embodiment are exposed to the atmosphere. An agitator 38 is provided in the filter feed tank 13. As is shown, agitator 38 is mounted on the upper end of a shaft 39 which passes through a seal 41 and is driven in a known manner by a drive means which is not illustrated. As such, agitator 38 serves to keep the contents of the filter feed tank 13 uniformly dispersed. Normally, filter feed tank 13 is sized to provide a retention time for a slurry contained therein of from approximately one hour to ten hours and preferably such tank is sized to provide a retention time for the slurry contained therein of from approximately 2 to 6 hours.

Reaction slurry is removed at a uniform rate from the filter feed tank 13 by a pump 42, the inlet connection of which communicates by means of process line 43 with an outlet 44 located adjacent the lower portion of the vertical side wall 13a of tank 13. Pump 42 discharges reaction slurry through a line 46 into the classifier 14.

Classifier 14 can be of any suitable construction which will permit a split of the reaction slurry received from the filter feed tank 13 through process line 46 into two slurry segments in accordance with crystal particle size. For example, classifier 14 could be in the form of a conventional centrifuge or spiral-vane classifier of the type commonly used to de-slime sands, wherein the very fine particles such as clay are separated from the coarser sand particles in a slurry.

In accordance with an important aspect of the present invention, classifier 14 is equipped to separate slurry feed containing calcium sulfate crystals, either in the form of gypsum crystals ($CaSO_4 \cdot 2H_2O$) and calcium sulfate hemihydrate crystals ($CaSO_4 \cdot \frac{1}{2} H_2O$). As can be appreciated and is commonly experienced in the art, the crystal fines, i.e, those which are generally of a particle size of 200 mesh or smaller, present serious problems insofar as filtration is concerned since they tend to collect in the pores of the filter media and thereby both increase the pressure drop across the filter media as the collection thereof increases and at the same time become caked therein producing a blinding of such filter media wherein even increased amounts of suction will not pull the liquid through the filter. When such filter blinding occurs, it is necessary to replace the filter media. Accordingly, the present invention has, as an important advantage, the prolonging of the life of filter media in wet process phosphoric acid manufacture by preventing such fines from coming into contact with such filter media while at the same time enabling such fines to be washed so as to remove all phosphoric acid occluded thereon.

In accordance with the present invention, the classifier 14 is equipped to separate the slurry received from the filter feed tank 13 into first and second slurry segments. The first slurry segment will include calcium sulfate crystals all of which are substantially smaller than a predetermined particle size, for example, substantially all of which are 200 mesh size or smaller. Such first slurry segment will be discharged adjacent the upper end of the classifier through a small particle size slurry outlet 47. Similarly, the classifier 14 will take the remaining slurry and calcium sulfate crystals, all of which are substantially larger than the predetermined particle size, and discharge the same through a larger size crystal particle slurry outlet 48.

In the illustrated embodiment, filter 16 is diagrammatically represented as a conventional pan filter. Pan filters are commonly used in the filtration of wet process phosphoric acid slurries wherein the phosphoric acid is separated from the calcium sulfate (whether it be in the form of gypsum or the hemihydrate crystal) through a series of stages wherein the calcium sulfate crystals are subjected to at least one washing step in a manner wherein the maximum recovery of $P_2O_5$ can be effected with a minimum of dilution of mother liquor. Such filters offer the advantage of providing operation on an automatic basis. In this regard, however, it is to be noted that the present invention is not limited to the pan filter type units but, with only minor modification, can be advantageously employed in all filter constructions which are used for filtering wet process phosphoric acid reaction slurries.

Referring to FIG. 1, it will be noted that filter 16 consists of a plurality of individual filter cells 49, 51, 52, 53, 54, 56, 57, 58 and 59 which are connected to a central distributor network vacuum source 61 through a plurality of vacuum lines 62, 63, 64, 66, 67, 68, 69, 71 and 72, respectively. Each of the individual filter cells is rotated through a plurality of stages which are generally indicated by the letters A, B, C, D, E, F, G, H, and I, wherein each of such cells goes through a complete cycle from receiving the first slurry segment through and including the removal of gypsum cake and preparation of such filter cell for a further repeat of the cycle. In particular, and as is generally shown in the drawing, the second slurry segment which is discharged from the classifier 14 through outlet 48 passes through the series of pipes generally designated by the reference numeral 48a and out of slurry feed trough 48b into individual filter cell 49 which in the sequential interval depicted in FIG. 1 is located at stage A. Since the second slurry segment contains crystal particles, which are substantially all larger than a predetermined size and does not contain appreciable, if any, crystal fines, the larger crystal particles contained therein are deposited directly upon the filter media which can be of conventional construction and is preferably in the form of a porous filter cloth. The vacuum source exerted on the underside of the filter cloth in each of the individual filter cells will, at stages A, B, C, and D withdraw undiluted mother liquor. In accordance with known techniques this mother liquor is discharged through a suitable product outlet which is not illustrated.

As is shown with respect to individual cell 52 at stage C the first slurry segment containing the crystal fines and generally including calcium sulfate particles all of which are substantially smaller than the predetermined size discharged from outlet 47 are deposited onto the larger crystal particles which have collected directly on the porous filter media. In this manner, the crystal fines will collect upon the larger sized crystal particles and thereby be prevented from coming into contact with the filter media to effectively avoid blinding of such filter media. For example, as is diagrammatically illustrated in FIG. 2, the larger crystal particles generally designated by the reference numeral 73 are deposited onto filter cloth 74 which in turn overlies a metal or other suitable screen 76. The crystal fines, designated by the reference numeral 77, from the first slurry segment discharged through feed trough 47b are deposited onto the larger sized crystal particles 73 and are not in contact with the cloth 74.

At stage E wash water from a suitable supply trough 78 is discharged onto the combined collection of crystal fines and larger sized crystal particles. If desired, in systems employing multi-wash stages, the liquid removed through the associated suction lines at subsequent washing stages can be used as the wash liquor in prior washing stages. At stage F the wash liquor recovered from the filter is generally in the form of weak phosphoric acid which can, if desired, be returned to inlet 24 for use in forming a slurry with the incoming phosphate rock feed. Transmission of such weak phosphoric acid wash water recovered from this filtering stage is diagrammatically shown as being returned to hopper inlet 24 through process piping which is generally designated by the reference numeral 79. After draining the last wash liquor, the vacuum directed to the individual filter cell is interrupted and the cell inverted to discharge the collected cake by gravity as generally shown at stage G. Air blown by suitable means (not illustrated) through the distributor 61 can, if desired, be used to assist in the loosening of the cake from the cloth. As soon as the cake has been removed, the filter media or filter cloth can be subjected to the action of a combination blower and water spray system 81 which provides a cleaning and drying operation at stage H for preparing the filter cell for a repeat cycle in the filtration operation. Following this filter media preparation stage, the individual cell is than rotated to its upright position as generally shown at stage I in preparation for its return to stage A from which the entire cycle is again repeated.

In operation, phosphate rock is continually fed to the reactor through the external mixing hopper 23, sulfuric acid introduced through the inlet connection 21 and weak phosphoric acid introduced through the inlet connection 24. A vacuum is created in the head space at the upper end of the unit 12. In this regard, it is important to note that the present invention is not limited to any particular operating conditions for the reaction slurry which conventionally are varied in accordance with the type of crystal to be formed. For example, in conventional process phosphoric acid systems wherein gypsum is produced, operating temperatures of 175° F are commonly employed while, correspondingly, in systems wherein the hemihydrate form of calcium sulfate crystals is produced, higher operating temperatures in the order of from approximately 200° F to 225° F are employed. Slurry withdrawn from the reactor unit 12 is discharged into filter feed tank 13 and after being retained in filter feed tank for from one hour to approximately ten hours (preferably from approximately two to six hours) is discharged into classifier 14 wherein the slurry is separated into first and second slurry segments. The first slurry segment includes calcium sulfate crystal particles which are substantially all smaller than a predetermined particle size. In accordance with the present invention, such first slurry segments should include substantially all of the calcium sulfate crystal particles which would be generally categorized as crystal fines in this art, for example those which are 200 mesh size or smaller. The second slurry segment, separated out in the classifier 14 and discharged through outlet 48, includes calcium sulfate crystal particles which are substantially all larger than the specific predetermined size and, in accordance with the present invention does not contain any, or at least does not contain appreciable amounts, of the so-called crystal fines. The second slurry segment is then discharged into an individual filter cell at stage A whereupon the calcium sulfate crystal particles which are larger than the predetermined size will be permitted to collect on the filter media. Subsequently, and after certain portions of the phosphoric acid contained thereon are removed through vacuum, the first slurry segment is deposited onto the larger calcium sulfate crystal particles which have collected and built up directly on filter media. In this manner, such larger size calcium sulfate crystal particles act as a filter precoat which substantially prevents the finer sized crystal particles from contacting the filter media and producing blinding thereof.

In the embodiment in the invention illustrated in FIG. 3, like reference numerals have been used to indicate components which can be identical to those shown in the FIG. 1 embodiment. Accordingly, in connection with the description of the FIG. 3 embodiment, the above set forth description with respect to components containing identical reference numerals is incorporated by reference.

As is generally shown in the FIG. 3 embodiment, the wet process phosphoric acid system is generally of the same arrangement and construction as the FIG. 1 embodiment. In this regard, however, it will be noted that the filter feed tank 13 and classifier 14 shown in the FIG. 1 embodiment are replaced by a single tank or free settling classifier 101 which is provided with a conical baffle 102 having a central opening 102a therein. Central opening 102a and slurry discharge feed line 37 are arranged so that over a suitable period of time the coarse crystals which are above the predetermined particle size will settle through the central opening 102a into the lower portion of the tank. In view of the fact that the more dense material will be collected in the lower portion of tank 101 over a period of time, impeller 38 is provided to enable such more dense material in a pumpable form. If desired, a recycle loop (not illustrated) can be provided communicating process line 48 with the upper portion of the tank 101 for return of a portion of the second slurry segment to the tank 101.

In operation, slurry containing the crystal fines and larger size crystal particles is received in tank 101 and after retention time of generally at least a minimum of two hours separates with the larger crystal sized particles above a predetermined size, (such as for example 200 mesh) passing through the central opening 102a in conical baffle 102 into the lower portion of the filter feed tank. Correspondingly, the smaller size crystal particles, those below the predetermined particle size and including substantially all of the fines, remain in the upper portion of such tank. A suitable pump 103 having an inlet connecting to the first slurry segment outlet 104 in tank 101 discharges such slurry fines into process line 47a for further treatment in accordance with the manner previously discussed in conjunction with the FIG. 1 embodiment. Correspondingly, an outlet 106 in the lower portion of tank 101 discharges the second slurry segment into a suitable pump 107 which discharges the same into process line 48 for filter treatment and filtration in accordance with the manner described above in conjunction with the FIG. 1 embodiment.

It will be appreciated by those skilled in the art that modification and variation may be made from the heretofore described embodiment without departing from the spirit and scope of this invention. Accordingly, the present invention is to be limited only by the scope of the appended claims.

We claim:

1. An improved reactor apparatus of the type wherein reactants are combined to produce a slurry containing solids of varying sizes which are separated from the liquid portion of the slurry by filtration, said apparatus comprising: a reactor vessel; means for adding reactants to said reactor vessel to produce a body of reaction slurry which includes said solid particles; means for withdrawing slurry from said reactor vessel; means for separating said withdrawn slurry into a first slurry segment containing solid particles, substantially all of which are above a predetermined size, and a second slurry segment containing crystal particles, substantially all of which are below said predetermined size; a filter for separating the solids in said slurry segments from the liquid portion thereof, said filter including a plurality of individual slurry-receiving compartments each of which includes a porous filter media, means for subjecting said individual slurry-receiving compartments to a series of sequential filtration operations; a first filter feed line communicating said slurry separating means with said filter, said first filter feed line being adapted to receive said first slurry segment from the slurry separating means for discharge of said first slurry segment into the slurry receiving compartment undergoing an initial filtration operation wherein said first slurry segment containing the larger solid particles is deposited directly onto said porous filter media; a second filter feed line communicating said slurry separating means with said filter, said second filter feed line being adapted to receive said second slurry segment from the slurry separating means for delivery thereof to a slurry receiving compartment undergoing a subsequent filtration operation and which has previously received the first slurry segment; whereby, the solid particles which are below said predetermined size are deposited directly onto said larger solid particles with the larger particles thereby acting as a filter precoat to substantially reduce blinding of the porous filter media by said smaller solid particles.

2. An improved reactor apparatus for producing wet process phosphoric acid, said apparatus comprising; a reactor vessel; means for adding reactants to said reactor vessel to produce a body of reaction slurry which includes calcium sulfate crystal particles, some of which are smaller than a predetermined size and the remainder of which are larger than said predetermined size; means for withdrawing slurry from said reactor vessel; means for separating said withdrawn slurry into a first slurry segment containing calcium sulfate particles, substantially all of which are above said predetermined particles size, and a second slurry segment containing calcium sulfate crystal particles, substantially all of which are below said predetermined size; a filter for separating solids in said slurry segment from the liquid portion thereof, said filter including a plurality of individual slurry receiving pans, each of which includes a porous filter media, means for moving said individual slurry-receiving pans to a plurality of locations for undergoing a series of sequential filtration steps; a first filter feed line communicating the slurry separating means with the slurry-receiving pan positioned at a first location wherein said slurry-receiving pan is subjected to an initial filtration step, said first filter feed line being operatively connected to said slurry separating means for receiving said first slurry segment and the discharge thereof directly onto the porous filter media of the slurry-receiving pan positioned at said first location; a second filter feed line communicating said slurry separating means with the slurry-receiving pan positioned at a second location downstream from said first location, said second filter feed line being operatively connected to said slurry separating means for receipt of said second slurry segment and discharge thereof onto said slurry-receiving pan positioned at said second location; whereby, calcium sulfate crystal particles which are below said predetermined size are deposited directly onto larger calcium sulfate crystal particles with said larger calcium sulfate crystal particles thereby acting as a filter precoat to substantially reduce blinding of said porous filter media by said smaller crystal particles.

3. The apparatus of claim 2 wherein said means for separating said withdrawn slurry is adapted to separate said withdrawn slurry into a first slurry segment wherein substantially all of the crystal particles contained therein are below 200 mesh size and into a second slurry segment wherein substantially all of the crystal particles contained therein are above 200 mesh size.

4. The apparatus of claim 2 wherein said means for separating said withdrawn slurry includes a centrifugal classifier.

5. The apparatus of claim 2 wherein said means for separating said withdrawn slurry comprises a tank having first and second compartments therein which communicate with each other through a settling port, said settling port being arranged to effect distribution of calcium sulfate crystal particles below said predetermined size substantially only in said first compartment and calcium sulfate crystal particles above said predetermined size substantially only in said second compartment, and first and second outlets in said tank respectively communicating with said first and second compartments, whereby said first and second slurry segments can be respectively withdrawn from said first and second outlets for separate discharge to said filter.

* * * * *